(12) United States Patent
Knight et al.

(10) Patent No.: US 11,452,952 B2
(45) Date of Patent: *Sep. 27, 2022

(54) OVAL FILTER WITH EXTERIOR ELLIPTICAL RADIAL SEAL AND INTERNAL SUPPORT STRUCTURE

(71) Applicant: CUMMINS FILTRATION IP, INC., Columbus, IN (US)

(72) Inventors: Jessie A. Knight, Oregon, WI (US); Scott Gerald Manke, Sun Prairie, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/113,619

(22) Filed: Dec. 7, 2020

(65) Prior Publication Data

US 2021/0086109 A1   Mar. 25, 2021

Related U.S. Application Data

(63) Continuation of application No. 16/115,040, filed on Aug. 28, 2018, now Pat. No. 10,918,978.

(Continued)

(51) Int. Cl.
*B01D 29/21* (2006.01)
*B01D 35/00* (2006.01)
(Continued)

(52) U.S. Cl.
CPC .......... *B01D 29/21* (2013.01); *B01D 35/005* (2013.01); *B01D 46/0005* (2013.01);
(Continued)

(58) Field of Classification Search
None
See application file for complete search history.

(56) References Cited

U.S. PATENT DOCUMENTS 2,108,283 A   2/1938   Drew et al.
3,295,687 A   1/1967   Schmerler
(Continued)

FOREIGN PATENT DOCUMENTS

CN   1652859   8/2005
CN   102258918   11/2011
(Continued)

OTHER PUBLICATIONS

International Search Report &Written Opinion for PCT/US2018/063976 dated Feb. 6, 2019, 10 pages.
(Continued)

*Primary Examiner* — Jason M Greene
(74) *Attorney, Agent, or Firm* — Foley & Lardner LLP

(57) ABSTRACT

Various embodiments relate to a filter element. The filter element includes a first endplate that defines a first endplate opening and a second endplate. Filter media is positioned between and extending axially between the first endplate and the second endplate. The filter media defines a central opening extending axially therein. A support structure is disposed within the central opening of the filter media and is attached to the first endplate and the second endplate. The support structure includes an axial lobed extension that extends from a first end of the support structure to a second end of the support structure. The support structure is configured to resist collapse of the filter element.

20 Claims, 5 Drawing Sheets

Related U.S. Application Data

(60) Provisional application No. 62/668,602, filed on May 8, 2018.

(51) Int. Cl.
   *B01D 46/00* (2022.01)
   *B01D 46/24* (2006.01)
   *F02M 37/42* (2019.01)

(52) U.S. Cl.
   CPC ..... *B01D 46/0015* (2013.01); *B01D 46/2414* (2013.01); *F02M 37/42* (2019.01); *B01D 2201/0415* (2013.01); *B01D 2257/702* (2013.01); *B01D 2265/028* (2013.01); *B01D 2275/208* (2013.01)

(56) References Cited

U.S. PATENT DOCUMENTS

| | | |
|---|---|---|
| 3,786,926 A | 1/1974 | Wilhelm |
| 4,613,438 A | 9/1986 | Degraffenreid |
| 4,916,001 A | 4/1990 | Whittenberger et al. |
| D326,706 S | 6/1992 | Karlsson |
| 5,609,761 A | 3/1997 | Franz |
| 5,800,580 A | 9/1998 | Feldt |
| 5,803,941 A | 9/1998 | Berkhoel et al. |
| 5,954,849 A | 9/1999 | Berkhoel et al. |
| D437,402 S | 2/2001 | Gieseke et al. |
| 6,197,191 B1 | 3/2001 | Wobben |
| D449,102 S | 10/2001 | Shin |
| 6,364,921 B1 | 4/2002 | Raether et al. |
| 6,387,162 B1 | 5/2002 | Kosmider et al. |
| 6,398,836 B1 | 6/2002 | Frankle |
| 6,485,544 B1 | 11/2002 | Ziske |
| 6,488,746 B1 | 12/2002 | Kosmider et al. |
| D475,781 S | 6/2003 | Mattsson et al. |
| D483,459 S | 12/2003 | DeWit et al. |
| D484,584 S | 12/2003 | Anderson et al. |
| D497,202 S | 10/2004 | Carter et al. |
| D499,177 S | 11/2004 | Kosmider et al. |
| 6,902,598 B2 | 6/2005 | Gunderson et al. |
| 6,966,940 B2 | 11/2005 | Krisko et al. |
| D525,120 S | 7/2006 | Maskell et al. |
| 7,147,110 B2 | 12/2006 | Clausen et al. |
| D545,396 S | 6/2007 | Casey et al. |
| 7,264,656 B2 | 9/2007 | Kosmider et al. |
| 7,282,077 B2 | 10/2007 | Honisch et al. |
| 7,332,009 B2 | 2/2008 | Casey et al. |
| 7,442,221 B2 | 10/2008 | Ruhland et al. |
| 7,670,403 B2 | 3/2010 | Modesto et al. |
| 7,828,870 B1 | 11/2010 | Rech et al. |
| RE42,174 E | 3/2011 | Gunderson et al. |
| 8,097,061 B2 | 1/2012 | Smith et al. |
| 8,182,569 B2 | 5/2012 | Casey et al. |
| 8,241,384 B2 | 8/2012 | Schrage et al. |
| 8,245,851 B2 | 8/2012 | Hawkins et al. |
| 8,394,164 B2 | 3/2013 | Casey et al. |
| 8,397,920 B2 | 3/2013 | Moy et al. |
| D690,407 S | 9/2013 | Williams et al. |
| D692,298 S | 10/2013 | Pipes et al. |
| 8,613,784 B2 | 12/2013 | Heckel et al. |
| 8,632,619 B2 | 1/2014 | Komori et al. |
| 8,685,128 B2 | 4/2014 | Schrage et al. |
| D706,831 S | 6/2014 | Schultz |
| 8,864,866 B2 | 10/2014 | Osendorf et al. |
| 8,961,637 B2 | 2/2015 | Raether et al. |
| D736,263 S | 8/2015 | Schultz |
| 9,168,477 B2 | 10/2015 | Schulz et al. |
| 9,205,361 B2 | 12/2015 | Menssen et al. |
| 9,308,482 B2 | 4/2016 | Kaiser |
| 9,320,997 B2 | 4/2016 | Campbell et al. |
| 9,358,489 B2 | 6/2016 | Kaufmann et al. |
| 9,415,333 B2 | 8/2016 | Kindkeppel et al. |
| 9,446,339 B2 | 9/2016 | Rieger et al. |
| 9,463,405 B2 | 10/2016 | Bartel et al. |
| 9,604,856 B2 | 3/2017 | Fall |
| 9,610,529 B2 | 4/2017 | Mills et al. |
| 9,623,351 B2 | 4/2017 | Kindkeppel et al. |
| 9,636,615 B2 | 5/2017 | Osendorf et al. |
| 9,649,581 B2 | 5/2017 | Conroy |
| 9,682,339 B2 | 6/2017 | Jursich et al. |
| D793,453 S | 8/2017 | Krull |
| D794,082 S | 8/2017 | Krull |
| D798,907 S | 10/2017 | Krull |
| D799,657 S | 10/2017 | Sullivan et al. |
| D804,004 S | 11/2017 | Madeira et al. |
| 9,849,408 B2 | 12/2017 | Stehle et al. |
| D819,698 S | 6/2018 | Krull |
| D819,699 S | 6/2018 | Krull |
| 9,987,571 B2 | 6/2018 | Klein et al. |
| D852,345 S | 6/2019 | Stanhope et al. |
| D884,866 S | 5/2020 | Knight et al. |
| 10,758,859 B2 | 9/2020 | Gieseke et al. |
| D909,557 S | 2/2021 | Jeon et al. |
| D911,642 S | 2/2021 | Burgess et al. |
| 10,918,978 B2 * | 2/2021 | Knight .............. B01D 46/0005 |
| D926,961 S | 8/2021 | Lee |
| D930,136 S | 9/2021 | Knight et al. |
| D935,587 S | 11/2021 | Wu |
| 11,198,082 B2 | 12/2021 | Rahn et al. |
| 2003/0168398 A1 | 9/2003 | Steger et al. |
| 2004/0035097 A1 | 2/2004 | Schlensker et al. |
| 2004/0238437 A1 | 12/2004 | Nguyen et al. |
| 2006/0070945 A1* | 4/2006 | Men ..................... B01D 29/21 |
| | | 210/485 |
| 2006/0096908 A1 | 5/2006 | Wolf et al. |
| 2007/0000830 A1 | 1/2007 | Snider et al. |
| 2007/0193236 A1 | 8/2007 | Merritt |
| 2008/0029453 A1 | 2/2008 | Mertens et al. |
| 2008/0041026 A1 | 2/2008 | Engel et al. |
| 2008/0245719 A1 | 10/2008 | Beard et al. |
| 2009/0064646 A1 | 3/2009 | Reichter et al. |
| 2009/0188220 A1 | 7/2009 | Freisinger et al. |
| 2010/0000922 A1 | 1/2010 | Crawford |
| 2010/0064646 A1* | 3/2010 | Smith ................ B01D 46/0005 |
| | | 55/501 |
| 2010/0252495 A1 | 10/2010 | Reid et al. |
| 2011/0210053 A1 | 9/2011 | Strassenberger |
| 2012/0160755 A1* | 6/2012 | LaCroix ................ B01D 29/21 |
| | | 210/232 |
| 2012/0223001 A1 | 9/2012 | Beard |
| 2012/0246907 A1 | 10/2012 | Morgan |
| 2013/0140227 A1 | 6/2013 | Stehle et al. |
| 2013/0228504 A1 | 9/2013 | Mcelroy et al. |
| 2013/0255203 A1 | 10/2013 | Muenkel et al. |
| 2014/0137525 A1 | 5/2014 | Campbell et al. |
| 2014/0165834 A1 | 6/2014 | Kaufmann et al. |
| 2014/0373495 A1 | 12/2014 | Madeira et al. |
| 2015/0020488 A1 | 1/2015 | Dhiman et al. |
| 2015/0101295 A1 | 4/2015 | Thompson et al. |
| 2015/0151233 A1 | 6/2015 | Johnson et al. |
| 2015/0343339 A1 | 12/2015 | Johnson et al. |
| 2015/0343359 A1 | 12/2015 | Neef et al. |
| 2016/0045848 A1 | 2/2016 | Campbell et al. |
| 2016/0051912 A1 | 2/2016 | Castaneda et al. |
| 2016/0131094 A1 | 5/2016 | Pereira Madeira et al. |
| 2016/0263495 A1 | 9/2016 | Wyhler et al. |
| 2016/0296867 A1 | 10/2016 | Stark et al. |
| 2016/0325212 A1 | 11/2016 | Pflueger et al. |
| 2017/0102101 A1 | 4/2017 | Duval-Arnould |
| 2017/0291129 A1 | 10/2017 | Sorger |
| 2017/0361249 A1 | 12/2017 | Ries et al. |
| 2018/0015406 A1 | 1/2018 | Nelson et al. |
| 2018/0043290 A1 | 2/2018 | Bautz et al. |
| 2018/0050296 A1 | 2/2018 | Fritzsching et al. |
| 2018/0161703 A1 | 6/2018 | Bautz et al. |
| 2018/0200652 A1 | 7/2018 | Merritt et al. |
| 2018/0318745 A1 | 11/2018 | Nichols et al. |
| 2019/0060816 A1 | 2/2019 | Wittmers et al. |
| 2019/0070548 A1 | 3/2019 | Franz et al. |
| 2019/0070549 A1 | 3/2019 | Fritzsching et al. |
| 2019/0111374 A1 | 4/2019 | Burton et al. |
| 2019/0134546 A1 | 5/2019 | Neef et al. |
| 2019/0224604 A1 | 7/2019 | Lin et al. |

(56) References Cited

U.S. PATENT DOCUMENTS

| | | |
|---|---|---|
| 2019/0270045 A1 | 9/2019 | Donauer et al. |
| 2019/0308123 A1 | 10/2019 | Neef et al. |
| 2019/0308124 A1 | 10/2019 | Neef |
| 2019/0308125 A1 | 10/2019 | Neef et al. |
| 2019/0308126 A1 | 10/2019 | Fritzsching et al. |
| 2019/0344207 A1 | 11/2019 | Knight et al. |
| 2020/0054982 A1 | 2/2020 | Decoster et al. |
| 2020/0384402 A1 | 12/2020 | Schwartz et al. |
| 2021/0086109 A1 | 3/2021 | Knight et al. |

FOREIGN PATENT DOCUMENTS

| | | |
|---|---|---|
| CN | 202538551 U | 11/2012 |
| CN | 103126613 | 6/2013 |
| CN | 103861397 | 6/2014 |
| CN | 104159652 | 11/2014 |
| CN | 204041298 U | 12/2014 |
| CN | 106039878 | 10/2016 |
| CO | 2017008045 | 10/2017 |
| DE | 24 29 474 A1 | 11/1975 |
| DE | 10 2004 063 346 A1 | 7/2006 |
| DE | 20 2009 000 969 U1 | 7/2010 |
| DE | 10 2009 050 587 A1 | 4/2011 |
| DE | 10 2013 216 853 A1 | 2/2015 |
| DE | 10 2015 015 778 A1 | 7/2016 |
| DE | 10 2016 004 316 A1 | 1/2017 |
| DE | 10 2016 008 475 A1 | 1/2017 |
| DE | 10 2016 004 317 | 10/2017 |
| EP | 1 031 310 A2 | 8/2000 |
| EP | 0 923 975 B1 | 5/2003 |
| EP | 1 658 121 | 5/2006 |
| FR | 2847488 A1 | 5/2004 |
| GB | 0 808 476 A | 2/1959 |
| GB | 2 346 568 | 8/2000 |
| GB | 2 375 494 A | 11/2002 |
| JP | 4141226 | 5/2004 |
| WO | WO-03/084641 A2 | 10/2003 |
| WO | WO-2005/011838 | 2/2005 |
| WO | WO-2011/146474 A1 | 11/2011 |
| WO | WO-2013/104797 | 7/2013 |
| WO | WO-2015/061599 | 4/2015 |
| WO | WO-2015/171744 A1 | 11/2015 |
| WO | WO-2016/082854 A1 | 6/2016 |
| WO | WO-2016/100772 A1 | 6/2016 |
| WO | WO-2017/012932 A1 | 1/2017 |
| WO | WO-2017/079191 A1 | 5/2017 |

OTHER PUBLICATIONS

Notice of Allowance for U.S. Appl. No. 16/115,040, dated Oct. 21, 2020.

Office Action for Brazilian Design App. No. BR302018002479-6 dated Nov. 13, 2018, one page.

Office Action for Design U.S. Appl. No. 29/646,936 dated Jul. 10, 2019, 5 pages.

Office Action for U.S. Appl. No. 16/115,040 dated Jun. 22, 2020, 11 pages.

Preliminary Search Report for French Patent App. No. 1851888 dated Nov. 13, 2018, 16 pages (with English translation).

International Search Report & Written Opinion for PCT/US2021/042780 dated Nov. 15, 2021, 13 pages.

Office Action issued for Colombian Patent Application No. CO NC2018/0012902 dated Nov. 29, 2021, 11 pages.

First Office Action issued for Chinese Patent Application No. CN 201880086455.6 dated Jun. 3, 2021, 17 pages.

Notice of Allowance on U.S. Appl. No. 29/733,863 dated May 11, 2021.

Non-Final Office Action issued for U.S. Appl. No. 16/769,742 dated Mar. 25, 2022, 26 pages.

Requirement for Restriction Election issued for U.S. Appl. No. 29/726,762 dated Jan. 13, 2022, 23 pages.

* cited by examiner

OVAL FILTER WITH EXTERIOR ELLIPTICAL RADIAL SEAL AND INTERNAL SUPPORT STRUCTURE

CROSS-REFERENCE TO RELATED PATENT APPLICATION

The present application is a continuation of U.S. patent application Ser. No. 16/115,040, filed Aug. 28, 2018, which claims the benefit of and priority to U.S. Provisional Patent Application No. 62/668,602, filed May 8, 2018, the contents of which are incorporated herein by reference in their entirety.

TECHNICAL FIELD

The present application relates to filtration systems. More particularly, the present application relates to fluid filtration systems having a replaceable filter element.

BACKGROUND

Internal combustion engines generally combust a mixture of fuel (e.g., gasoline, diesel, natural gas, etc.) and air. Lubrication oil is also supplied to the engine to lubricate the various moving components of the engine. Either prior to entering the engine or during engine operation, the intake air, fuel, lubrication oil, and other fluids are typically passed through filtration systems to remove contaminants (e.g., dust, water, oil, etc.) from the fluids. The filtration systems include filter elements having filter media. As the fluid passes through the filter media, the filter media removes at least a portion of the contaminants in the fluid.

The filter elements (e.g., filter cartridges) often include a seal member that is compressed against a component of the filtration system housing or another portion of the filtration system. Proper sealing in such systems is important to maintain system efficiency in order to meet emission regulations and provide suitable protection to an engine. That is, proper sealing is needed to maintain separation between "dirty" and "clean" sides of a filter used in such systems. The filter element and sealing element may include shapes that, when the axial length of the filter element increases, cause the filter element to collapse under certain filtration conditions.

SUMMARY

Various embodiments relate to a filter element. The filter element includes a first endplate that defines a first endplate opening and a second endplate. Filter media is positioned between and extending axially between the first endplate and the second endplate. The filter media defines a central opening extending axially therein. A support structure is disposed within the central opening of the filter media and is attached to the first endplate and the second endplate. The support structure includes an axial lobed extension that extends from a first end of the support structure to a second end of the support structure. The support structure is configured to resist collapse of the filter element.

Another example embodiment relates to a filtration system. The filtration system includes a housing and a filter element positioned within the housing. The filter element includes a first endplate that defines a first endplate opening and a second endplate. Filter media is positioned between and extending axially between the first endplate and the second endplate. The filter media defines a central opening extending axially therein. A support structure is disposed within the central opening of the filter media and is attached to the first endplate and the second endplate. The support structure includes an axial lobed extension that extends from a first end of the support structure to a second end of the support structure. The support structure is configured to resist collapse of the filter element.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to a filtration system with a filter element that includes a unique sealing configuration between a filter element and a housing and an internal support structure within the filter element that inhibits collapse of the filter element during operation. The seal interface is provided between one end of a filter element and one end of a mating head or component of a housing. The filter element has an elliptical shaped extension with a gasket around its outer perimeter. For the mating component, a housing has a portion with an elliptical shaped portion to seal against the elliptical shaped extension of the filter element. The seal interface described herein can provide a keying feature which can be helpful to ensure that the correct filter element is being installed and can help make installation easier. Accordingly, the filter element with the elliptical sealing configuration allows for a wide variety of filter element designs that includes different shapes and sizes and, due to the elimination of flat section in the seal zone, provides improved sealing between the housing and filter element. An internal support structure within the filter element provides resistance to the filter element collapse, thereby allowing for larger aspect ratios of the filter element (e.g., longer and narrower). As will be appreciated, as the aspect ratio of the filter element increases, the stress on the filter media and filter element increases, as does the risk of filter element collapse. Beneficially, the internal support structure includes axial lobed support members and cross members that provide support against filter element collapse during operation.

As used herein, the term "elliptical" refers to a shape that is a mathematically true ellipse: a closed plane curve generated by a point moving in such a way that the sums of its distances from two fixed points is a constant. As will be appreciated, features described as elliptical, for example the elliptical protruding member, may have different circular shapes in alternative embodiments. The term "oval" refers to a shape that has a rounded and slightly elongated outline or shape, for example the shape similar to an egg. Additionally, "oval" refers to a "racetrack" shape that is two hemispherical portions that are mirrored and two substantially parallel straight surfaces that connect the hemispherical portions.

Figure 1A:
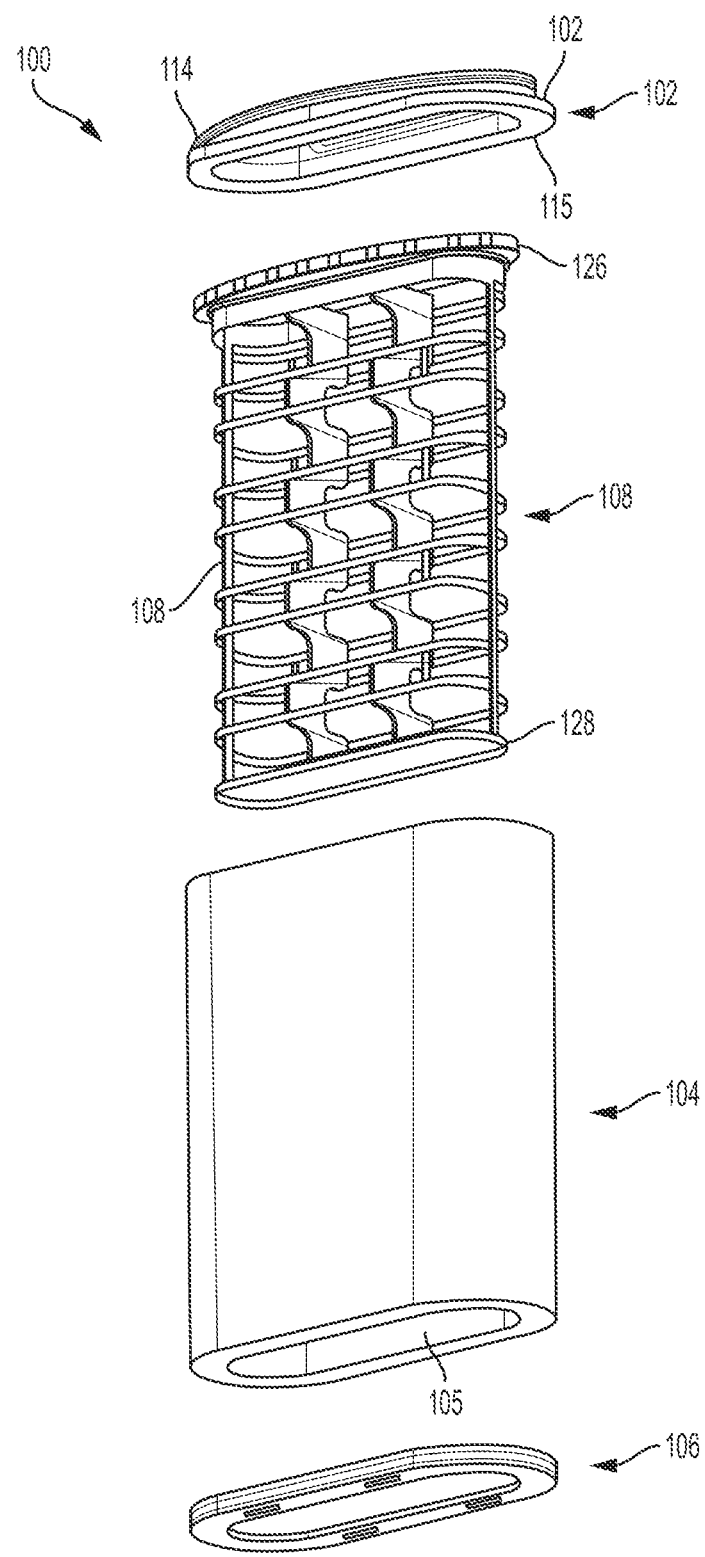
FIG. 1A shows an exploded side view of a filter element with an elliptical seal and an internal support structure according to an example embodiment.
Figure 1C:
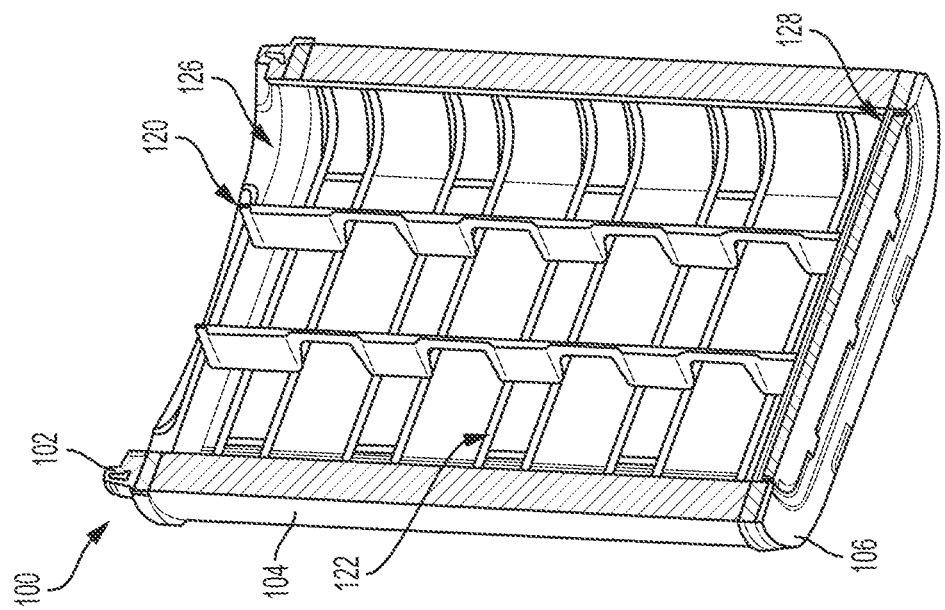
FIG. 1C shows a cross-sectional view of the filter element of FIG. 1A.
Figure 1B:
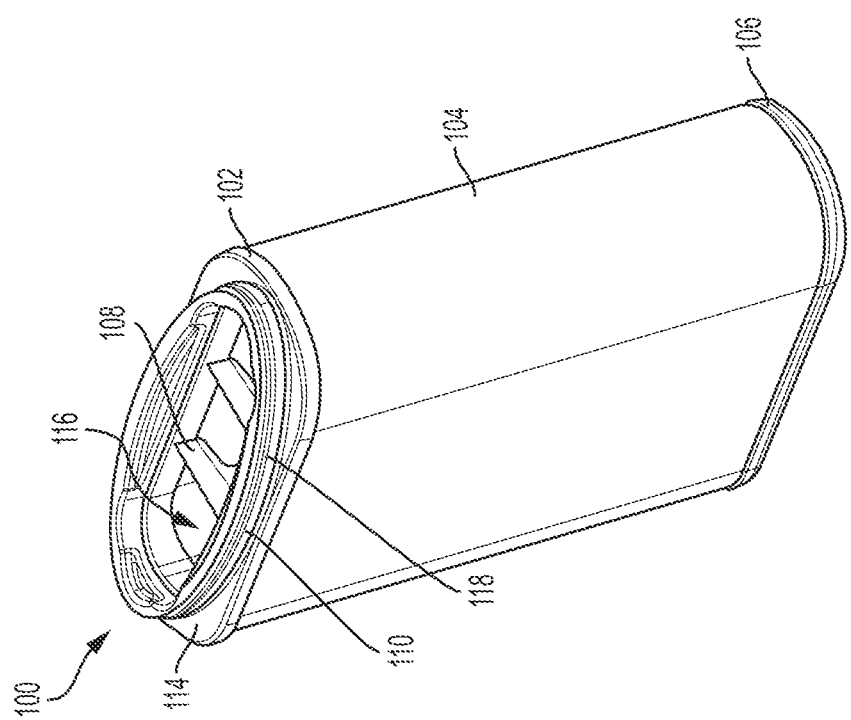
FIG. 1B shows a perspective view of a filter element of FIG. 1A.

Referring to FIGS. 1A and 1B, an exploded and perspective view of a filter element 100 that includes an elliptical protruding member 110 and an internal support structure 108 is shown, according to an example embodiment. The filter element 100 includes a first endplate 102 that includes the elliptical protruding member 110, a second endplate 106, filter media 104, and the internal support structure 108 disposed between the first endplate 102 and the second endplate 106 and disposed within the filter media 104. The filter element 100 may be a cylindrical filter element with similarly shaped components. As will be appreciated, the filter element 100 may be installed in an interior compartment of a housing that has a similar elliptical shape or another shape that can receive the shape and size of the filter element 100 and/or attached to a filter head. In some arrangements, the filter element 100 is connected to a filter mounting head, and a housing is also attached to the filter mounting head (e.g., via a threaded connection in arrangements where the housing is a spin-on housing).

The filter media 104 is positioned between and extending axially between the first endplate 102 and the second endplate 106. The filter media defines a central opening 105 that extends axially therein. As shown in FIGS. 1A-1C, the filter media 104 is racetrack shaped, however a wide variety of shapes, including non-round configurations or differing aspect ratios may be implemented. In some embodiments, the filter media 104 has a non-round configuration with an aspect ratio between 0.20 and 0.30 (e.g., min/max). The filter media 104 includes an inner clean (e.g., filtered fuel) side and an outer dirty (e.g. unfiltered fuel) side. Accordingly, the filter element 100 is an outside-in flow filter element. In an alternative arrangement, the filter element 100 is an inside-out flow filter element having an inner dirty side and an outer clean side. Fluid to be filtered passes from the dirty side of the filter media 104 to the clean side of the filter media 104. The filter media 104 may include any of paper-based filter media, fiber-based filter media, foam-based filter media, pleated filter media, or the like. Pleated filter media refers to filter media that is folded along a plurality of bend lines extending axially along an axial direction between an upstream inlet and a downstream outlet. In some embodiments, a flat sheet of filter media is alternately folded along a plurality of pleat fold lines, thereby defining a pleat block. The pleated filter media may include a plurality of wall segments extend in serpentine manner between the bend lines and define axial flow channels therebetween.

Figure 2:
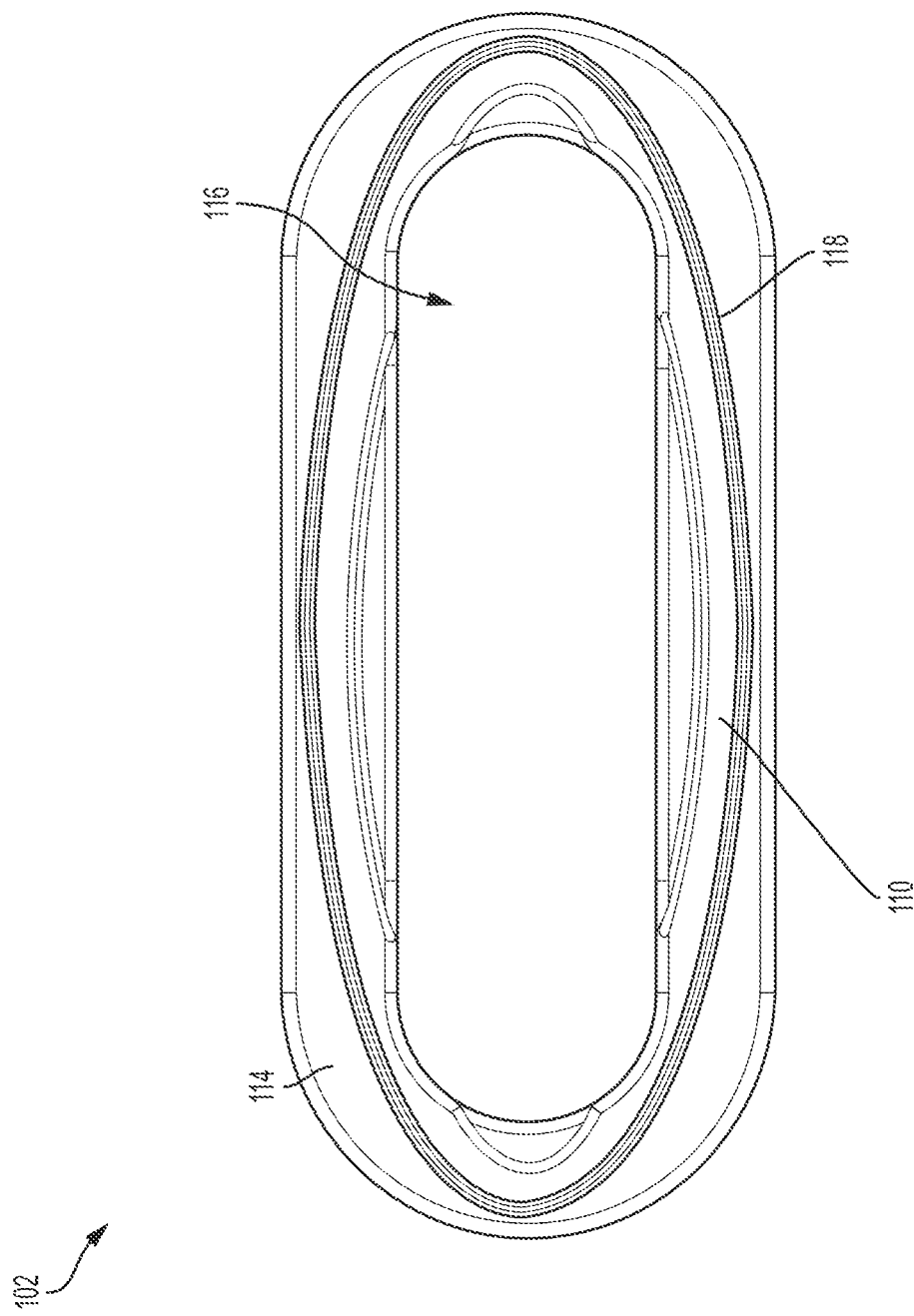
FIG. 2 shows a top view of the elliptical protruding member of the filter element of FIG. 1A.

The first endplate 102 may include a plurality of retention tabs to secure the filter element 100 to a filter mounting head of a filtration system when the filter element 100 is installed in the filtration system. As shown in FIG. 1A, the first endplate 102 is coupled to a first, top end of the filter media 104 and is an open endplate including an opening 116. The first endplate 102 includes a first end surface 114 and a second end surface 115 spaced axially from the first end surface 114. The first end surface 114 includes the elliptical protruding member 110 extending axially from the first end surface 114 in a direction away from the filter media 104. The elliptical protruding member 110 substantially surrounds the opening 116. Generally, the elliptical protruding member 110 is disposed on the first endplate 102 and is configured to engage a housing or a filter mounting head (not shown). In particular embodiments, the elliptical protruding member 110 may have an aspect ratio of 0.35 and 0.40 (e.g., min/max). The ellipse shape of the elliptical protruding member 110 eliminates flat sections in the urethane seal zone, which can be difficult to create a seal with. When the filter element 100 is installed within a housing, the elliptical protruding member 110 forms an elliptical radial seal between the housing and the filter element 100, thereby preventing fluid from bypassing the filter element 100. As will be appreciated, the shape of the first endplate 102 may be a different shape from the elliptical protruding member 110. For example, and as shown in the top view of the first endplate 102 of FIG. 2, the elliptical protruding member 110 is an elliptical shape and the first endplate 102 is a racetrack shape.

An elliptical seal member 118 is disposed about an outer surface of the elliptical protruding member 110. The elliptical seal member 118 is configured to provide a seal interface between the filter element 100 and the mating head (e.g. housing). One function of the elliptical seal member 118 is to provide sealing between the "dirty" and "clean" sides of the filter element. As shown, the elliptical protruding member 110 protrudes from the first endplate 102 such that the elliptical seal member 118 is positioned along an "insertion axis" to ensure sealing capability between the two components. The insertion axis refers to the sealing location when the elliptical protruding member 110 is inserted into a similar shaped elliptical portion in the mating head.

In some embodiments, an elliptical gasket is partially disposed in the elliptical seal member 118 of the elliptical protruding member 110. In one embodiment, the elliptical gasket is overmolded onto the elliptical protruding member 110. In other embodiments, the elliptical seal member 118 is a slip-on gasket that may be attached to the elliptical protruding member 110 through an interference fit between the elliptical seal member 118 and elliptical protruding member 110. The elliptical gasket further provides a low insertion force while maintaining a robust joint and sealing surface between the filter element 100 and a housing. In some embodiments, the elliptical seal member 118 is configured to provide an easy insertion gasket shape since the portion of gasket engagement against insertion depth would be a continuous and smoothly varying function. In other words, the continuous and smoothly varying shape of the elliptical seal member 118 can help make installment and servicing of the filter element 100 easier.

In some embodiments, the elliptical seal member 118 may include at least one peak and/or oscillating configuration. The peak is a raised portion that extends axially away from the first end surface 114 of the first endplate 102 and toward the end of the elliptical protruding member 110. The peak structure can allow for an even lower insertion force during the initial engagement between the filter element 100 and a receptive housing. In some embodiments, the peak structure is configured and arranged with projecting tangent arcs in a wave pattern around the surface of the elliptical protruding member 110. Such a shape of the elliptical seal member 118 can create a continuous curvature. For example, a first peak and a second peak are oppositely disposed on sides of the elliptical seal member 118 in an outline of a hyperbolic paraboloid or outline of a "saddle" surface. The hyperbolic paraboloid may be employed to provide a gradual increase in insertion force as opposed to an abrupt increase caused by flat sections.

The filter element 100 further includes a second endplate 106 coupled to a second, bottom end of the filter media 104. As shown in FIG. 1A, the second endplate 106 is a closed endplate. In some embodiments, the second endplate 106 is an open endplate that includes a central opening sized and shaped to receive a component of a filtration system (e.g., a standpipe) when the filter element 100 is installed in an operating position within the filtration system.

Turning to FIG. 1C, a cross-sectional view of the filter element 100 is shown. The cross-sectional view shows portions of the plurality of axial lobed extensions 120 and a plurality of cross-ribs 122 of the internal support structure 108. As shown in FIG. 1C, the plurality of axial lobed extensions 120 include a first axial lobed extension 134 and a second axial lobed extension 136. Each axial lobed extension extends from a first end of the internal support structure 126 to a second end of the internal support structure 128. The first axial lobed extension 134 is axially spaced away from the second axial lobed extension 136. Each cross-rib in the plurality of cross-ribs 122 extends radially around a perimeter of the internal support structure 108 and each cross rib axially displaced from an adjacent cross rib. As shown in FIG. 1C, the first end of the internal support structure 126 is configured to position adjacent to and/or with the first endplate 102. Additionally, the second end of the internal support structure 128 is configured to position adjacent to and/or with the second endplate 106. The internal support structure 108 is expanded in greater detail below in relation to FIGS. 3A and 3B. In some embodiments, the plurality of axial lobed extensions 120 may comprise an axial extending portion with non-lobed (e.g., substantially straight) portions that extend axially between at least one lobed portion and an end of the internal support structure 108. In other embodiments, the axial lobed extensions may extend in substantially the same direction with respect to the central axis of the filter element 100. The lobed extensions may comprise flared or substantially straight protrusions that extends away from a central axis of the axial lobed extension.

Figure 3B:
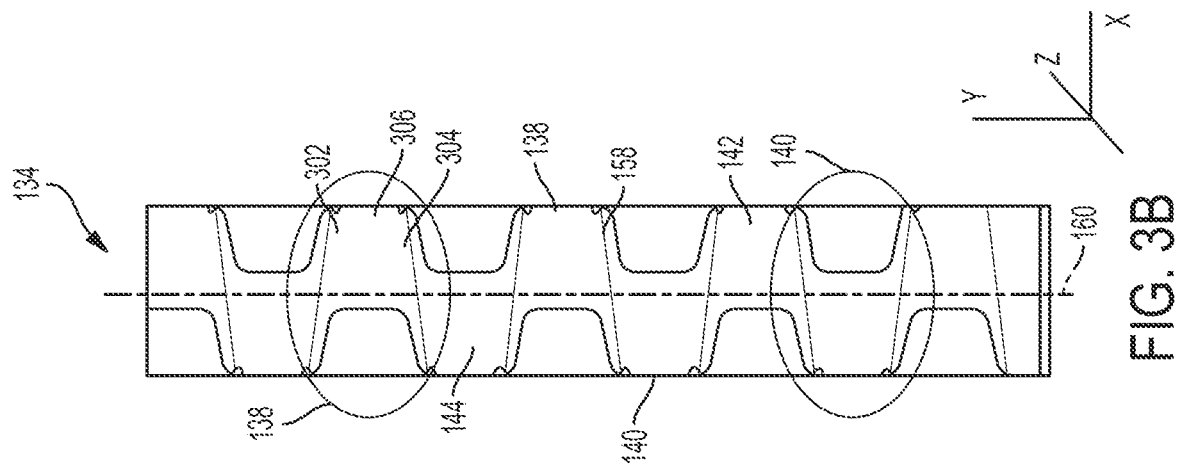
FIG. 3B shows a perspective view of a single axial support member of the internal support structure of FIG. 3A.
Figure 3A:
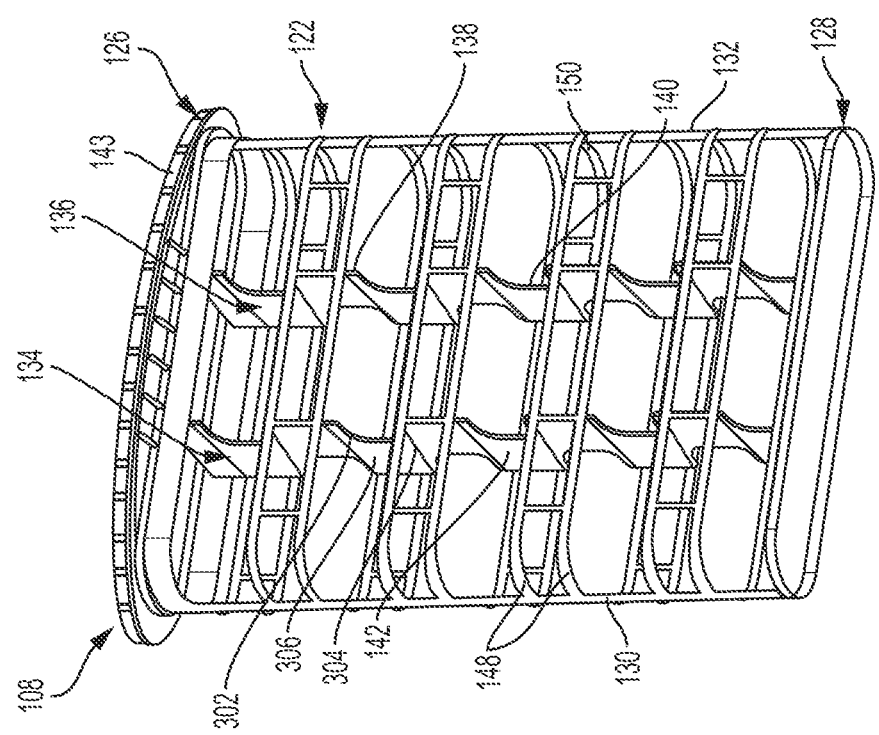
FIG. 3A shows a perspective view of the internal support structure of the filter element of FIG. 1A according to an example embodiment.

Referring to FIG. 3A, a perspective view of the internal support structure 108 of the filter element 100 of FIG. 1A. Additionally, FIG. 3B shows a perspective view of a first axial lobed extension 134 of the internal support structure 108 of FIG. 3A. The internal support structure 108 includes the first end of the internal support structure 126, the second end of the internal support structure 128, a first axial support 130, and a second axial support 132. In some embodiments, the internal support structure 108 is a plastic interbody that is molded to form the various elements of the internal support structure 108 (e.g., it is a single, integral unit). In other embodiments, the interbody of the internal support structure 108 is made of a metal alloy (e.g., steel). As will be appreciated, the plastic interbody provides a variety of advantages over a metal alloy interbody including ease of molding, lower cost, wider variety of seal areas, and greater design efficiency.

As shown best in FIGS. 1B and 3A, the first axial lobed extension 134 and the second axial lobed extension 136 define three "sections" of the filter element 100. The first section is defined by the first axial support 130 and the first axial lobed extension 134, the second section is defined by the first axial lobed extension 134 and the second axial lobed extension 136, and the third section is defined by the second axial lobed extension 136 and the second axial support 132. The first axial lobed extension 134 and the second axial lobed extension 136 are configured to encourage cross flow between the various sections (defined by the first axial lobed extension 134 and the second axial lobed extension 136) of the filter element 100.

As shown in FIG. 3A, the first end of the internal support structure 126 includes an elliptical extension 143 configured to engage the elliptical protruding member 110 of the first endplate 102. In some embodiments, the elliptical protruding member 110 is molded onto the first end of the internal support structure 126 as one integral unit. The first axial support 130 and the second axial support 132 each extend from the inner diameter (e.g., around the opening 116 of the first endplate 102) of the first end of the internal support structure 126 towards the second end of the internal support structure 128 at a respective pole of the hemispherical portions. As will be appreciated, the first end of the internal support structure 126, the second end of the internal support structure 128, the first axial support 130, and the second axial support 132 form the skeleton of the internal support structure 108. Around the perimeter of the internal support structure 108 (e.g., lining up with the perimeter of the second end of the internal support structure 128 and the first axial support 130 and the second axial support 132) the plurality of cross-ribs 122 provide radial support and structure to the filter element 100 by way of the internal support structure 108. As shown in FIG. 3A, each set of cross-ribs in the plurality of cross ribs includes two concentric, cross-rib bands 148 connected by a plurality of axial connecting ribs 150. In some embodiments, each cross-rib band 148 is connected to a lobe of the axial lobed extensions 120.

The first axial lobed extension 134 includes a first set of laterally extending lobes 138 and a second set of laterally extending lobes 140. As shown in FIG. 3B, each lobe in the first set of laterally extending lobes 138 extends in a lateral direction (e.g., x-axis) relative to the axial direction (e.g., y-axis). Each lobe in the first set of laterally extending lobes 138 is axially spaced from another lobe in the first set of laterally extending lobes 138, such that a lobe in the second set of laterally extending lobes 140 is disposed between each lobe in the first set of laterally extending lobes 138. Each lobe in the second set of laterally extending lobes 140 extends in the lateral direction in a direction relative to the axial direction that is opposite from the first set of laterally extending lobes 138. In other words, the first set of laterally extending lobes 138 and the second set of laterally extending lobes 140 are substantially mirrored about the central axis 160 (e.g., y-axis) of the first axial lobed extension 134. The connection of the first set of laterally extending lobes 138 and the second set of laterally extending lobes 140 (which is mirrored about the central axis 160) defines an undulating pattern along both sides of the first axial lobed extension 134. In some embodiments, the first set of laterally extending lobes 138 and/or the second set of laterally extending lobes 140 may be mirrored about the central axis 160 at different locations and/or angles to facilitate cross flow between different sections of the filter element 100. For example, a lobe in the first set of laterally extending lobes 138 is angled at a substantially 45-degree angle toward the center of the internal support structure 108 such that a substantially 90-degree angle is formed along first axial lobed extension 134. In other embodiments, each lobe in the first set of laterally extending lobes 138 includes a first angled portion 302, a second angled portion 304, and a flat portion 306 disposed between the first angled portion 302 and the second angled portion 304. The first angled portion 302 and the second angled portion 304 are angled at a substantially 45-degree angle toward the center of the support structure 108 in opposite directions (although the precise angle may vary). The flat portion 306 is substantially parallel to the center of the support structure 108. Each lobe in the second set of laterally extending lobes 140 may include a mirrored version (about the central axis 160) of the first angled portion 302, second angled portion 304, and flat portion 306.

The first set of laterally extending lobes 138 and the second set of laterally extending lobes 140 are joined at a connection plane 158 along a lateral axis (e.g., substantially parallel to the x-axis). The connection plane 158 is the transition from the first set of laterally extending lobes 138 to the second set of laterally extending lobes 140. In some embodiments, the connection plane 158 may be diagonally orientated (e.g., angled between the x-axis and/or y-axis) depending on the orientation of each lobe. The connection plane 158 of the first axial lobed extension 134 with the first end of the internal support structure 126 and the second end of the internal support structure 128 is substantially parallel to the x-axis. As will be appreciated, one or both ends of the first axial lobed extension 134 may be a partially formed first set of laterally extending lobes 138 or a partially formed second set of laterally extending lobes 140.

Each lobe in the first set of laterally extending lobes 138 has a first flared portion 142 that extends in the z-axis with respect to the y-axis. In some embodiments, the first flared portion 142 is angled away from (e.g., perpendicular to) the central axis 160 from one connection plane 158 to another connection plane 158 on the same lobe. Similarly, each lobe in the second set of laterally extending lobes 140 has a second flared portion 144 that extends in the z-axis with respect to the y-axis in a direction that is opposite to the first flared portion 142. In some embodiments, the second flared portion 144 is angled away from (e.g., perpendicular to) the central axis 160 from one connection plane 158 to another connection plane 158 on the same lobe. In other embodiments, the first flared portion 142 and the second flared portion 144 extend in the same direction in the z-axis with respect to the y-axis. The first flared portion 142 and the second flared portion 144 may include a wide variety of orientations, sizes, and configuration to promote cross flow between the sections defined in the filter element 100.

Figure 4B:
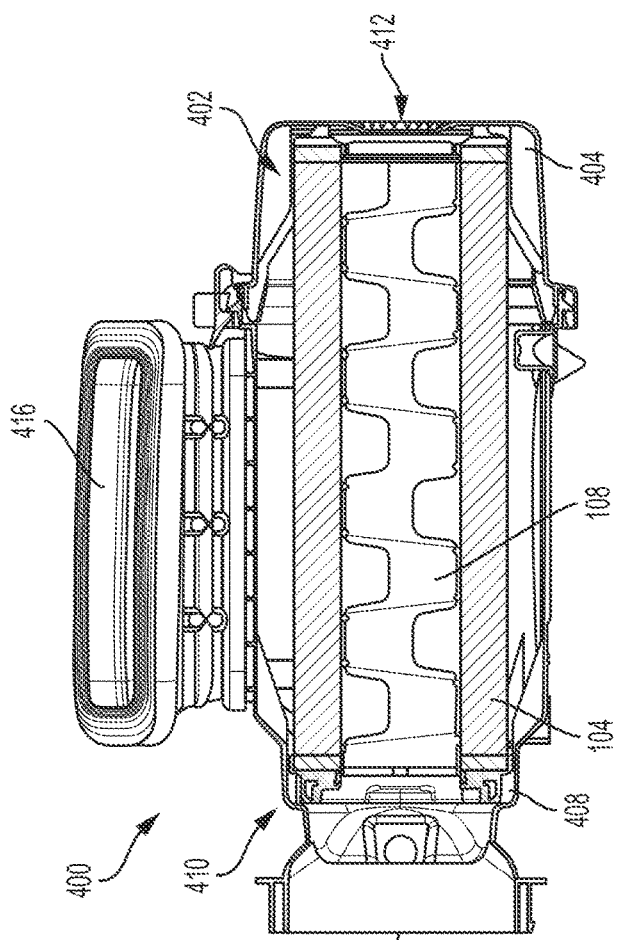
FIG. 4B shows a cross-sectional view of the filtration system of FIG. 4A.
Figure 4A:
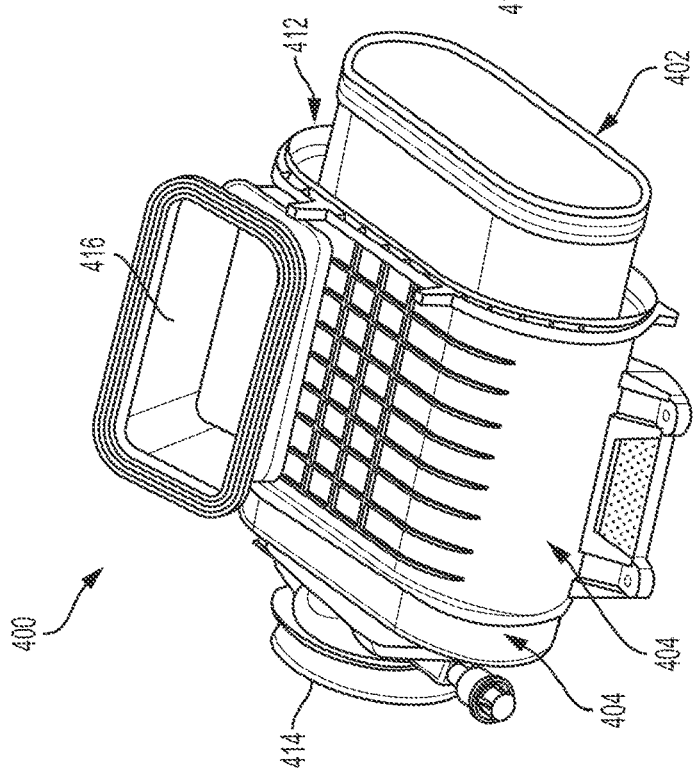
FIG. 4A shows a perspective view of a filtration system having a filter element with an elliptical seal and an internal support structure according to an example embodiment.

Referring to FIGS. 4A and 4B, a perspective and cross-sectional view of a filtration system 400 a filter element 402 with an elliptical protruding member 110 and an internal support structure 108 is shown, according to an example embodiment. The filter element 402 is similar to the filter element 100 described in FIGS. 1A-1C. A difference between the filter element 402 and the filter element 100, is the filter element 402 has the width and length to fit into the housing 404 of the filtration system 400. Accordingly, similar elements between the filter element 402 and filter element 100 will have similar numbering.

The housing 404 has a first housing end 410 having a housing opening 414, a second housing end 412, and an outlet 416. The housing 404 is releasably connected to the filter element 402. As one example, the filter element 402 is inserted in an axial direction to mount onto the housing 404. The housing 404 has a mounting component that includes an elliptical boss 408 that surrounds the first housing end 410. When the filter element 402 is connected to the housing 404, the housing opening 414 is in fluid communication with the opening 116 of the first endplate 102 of the filter element 100. The elliptical boss 408 mates with the elliptical protruding member 110 and forms a seal with the elliptical seal member 118. In use, for example, the filter element 100 is connected to the housing 404 when the elliptical protruding member 110 is inserted into the elliptical boss 408, such that the elliptical boss 408 surrounds the elliptical protruding member 110 and elliptical seal member 118, and a radially directed seal is formed. As described above, the elliptical seal member 118 may include an elliptical gasket that provides improved sealing between the filter element 402 and the housing 404. In some embodiments, the elliptical boss 408 of the housing 404 can have a shoulder that abuts the first end surface 114 of the first endplate 102.

In some embodiments, the elliptical boss 408 and the elliptical protruding member 110 can provide a keying feature to ensure that the correct filter element 402 is being installed into the housing 404. For example, a plurality of tabs around the elliptical protruding member 110 (or in some cases on the first end surface 114) of the first endplate 102 engage with a complementary plurality of slots in the elliptical boss 408 (or in some cases on the first housing end 410) of the housing 404. This tab and slot configuration can help orient and "key" the filter element 402 within the housing 404 to further help insure that the correct filter element is being installed into the filtration system 400. In other embodiments, the elliptical boss 408 includes a side opening formed in a wall of the elliptical boss 408 and the elliptical protruding member 110 includes an anchor portion that is configured to engage an inner diameter of the elliptical boss 408. The anchor point provides a keying feature and an additional locking feature when the anchor portion is retained in the elliptical boss 408.

It should be noted that any use of the term "exemplary" herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various exemplary embodiments without departing from the scope of the present invention.

What is claimed is:

1. A filter element comprising:
a first endplate defining a first endplate opening;
a second endplate;
filter media positioned between and extending axially between the first endplate and the second endplate, the filter media defining a central opening extending axially therein; and
a support structure disposed within the central opening of the filter media and attached to the first endplate and the second endplate, the support structure comprising an axial lobed extension that extends from a first end of the support structure to a second end of the support structure, the axial lobed extension comprising a unitary extension member comprising an undulating and alternating series of first lobes and second lobes, the first lobes and the second lobes comprising at least one substantially straight protrusion that extends laterally away from a central axis of the unitary extension member, the first lobes laterally offset from the second lobes, the support structure configured to resist collapse of the filter element.

2. The filter element of claim 1, wherein the first lobes are offset from a central axis of the unitary extension member in a first lateral direction, and wherein the second lobes are offset from the central axis of the unitary extension member in a second lateral direction opposite the first direction.

3. A filter element, comprising:
a first endplate defining a first endplate opening;
a second endplate;
filter media positioned between and extending axially between the first endplate and the second endplate, the filter media defining a central opening extending axially therein; and
a support structure disposed within the central opening of the filter media and attached to the first endplate and the second endplate, the support structure comprising an axial lobed extension that extends from a first end of the support structure to a second end of the support structure, the axial lobed extension comprising a unitary extension member comprising an undulating and alternating series of first lobes and second lobes, the first lobes laterally offset from the second lobes, the support structure configured to resist collapse of the filter element, wherein the first lobes are offset from a central axis of the unitary extension member in a first lateral direction, and wherein the second lobes are offset from the central axis of the unitary extension member in a second lateral direction opposite the first direction, wherein each first lobe includes a first angled portion, a second angled portion, and a flat portion disposed between the first angled portion and the second angled portion, the first angled portion and the second angled portion angled toward the central axis of the unitary extension member, and the flat portion being parallel to the central axis of the unitary extension member.

4. The filter element of claim 1, wherein each first lobe is joined to a second lobe at a respective connection plane, each connection plane structured to transition from a respective first lobe to a respective second lobe.

5. A filter element, comprising:
a first endplate defining a first endplate opening;
a second endplate;
filter media positioned between and extending axially between the first endplate and the second endplate, the filter media defining a central opening extending axially therein; and
a support structure disposed within the central opening of the filter media and attached to the first endplate and the second endplate, the support structure comprising an axial lobed extension that extends from a first end of the support structure to a second end of the support structure, the axial lobed extension comprising a unitary extension member comprising an undulating and alternating series of first lobes and second lobes, the first lobes laterally offset from the second lobes, the support structure configured to resist collapse of the filter element, wherein the first lobes are offset from a central axis of the unitary extension member in a first lateral direction, and wherein the second lobes are offset from the central axis of the unitary extension member in a second lateral direction opposite the first direction, wherein each of the first lobes has a first flared portion that extends in a z-axis with respect to a y-axis, such that the first flared portion is angled away from the y-axis, and each of the second lobes has a second flared portion that extends in the z-axis with respect to the y-axis in a direction that is opposite to the first flared portion.

6. A filter element, comprising:
a first endplate defining a first endplate opening;
a second endplate;
filter media positioned between and extending axially between the first endplate and the second endplate, the filter media defining a central opening extending axially therein; and
a support structure disposed within the central opening of the filter media and attached to the first endplate and the second endplate, the support structure comprising an axial lobed extension that extends from a first end of the support structure to a second end of the support structure, the axial lobed extension comprising a unitary extension member comprising an undulating and alternating series of first lobes and second lobes, the first lobes laterally offset from the second lobes, the support structure configured to resist collapse of the filter element, wherein each of the first lobes has a first flared portion that extends in a z-axis with respect to a y-axis, such that the first flared portion is angled away from the y-axis, and each of the second lobes has a second flared portion that extends in the z-axis with respect to the y-axis in the same direction in the z-axis with respect to the y-axis as the first flared portion.

7. A filter element, comprising:
a first endplate defining a first endplate opening;
a second endplate;
filter media positioned between and extending axially between the first endplate and the second endplate, the filter media defining a central opening extending axially therein; and a support structure disposed within the central opening of the filter media and attached to the first endplate and the second endplate, the support structure comprising an axial lobed extension that extends from a first end of the support structure to a second end of the support structure, the axial lobed extension comprising a unitary extension member comprising an undulating and alternating series of first lobes and second lobes, the first lobes laterally offset from the second lobes, the support structure configured to resist collapse of the filter element, wherein the axial lobed extension is a first axial lobed extension, the support structure further comprising a second axial lobed extension spaced radially away from the first axial lobed extension, the second axial lobed extension extending from the first end of the support structure to the second end of the support structure.

8. The filter element of claim 7, wherein the second axial lobed extension comprises a unitary extension member comprising an undulating and alternating series of first lobes and second lobes, the first lobes laterally offset from the second lobes.

9. The filter element of claim 8, wherein the first endplate comprises a first end surface and a second end surface spaced axially from the first end surface, the first endplate opening extending from the first end surface to the second end surface, and further comprising an elliptical protruding member protruding axially from the first end surface of the first endplate away from the filter media and surrounding the first endplate opening, the elliptical protruding member comprising an outer surface with a seal member.

10. A filter element, comprising:
a first endplate defining a first endplate opening;
a second endplate;
filter media positioned between and extending axially between the first endplate and the second endplate, the filter media defining a central opening extending axially therein; and
a support structure disposed within the central opening of the filter media and attached to the first endplate and the second endplate, the support structure comprising an axial lobed extension that extends from a first end of the support structure to a second end of the support structure, the axial lobed extension comprising a unitary extension member comprising an undulating and alternating series of first lobes and second lobes, the first lobes laterally offset from the second lobes, the support structure configured to resist collapse of the filter element, further comprising a first axial support extension and a second axial support extension disposed laterally from the first axial support extension, the first axial support extension extending from an inner diameter of the first end of the support structure to an inner diameter of the second end of the support structure.

11. The filter element, comprising:
a first endplate defining a first endplate opening;
a second endplate;
filter media positioned between and extending axially between the first endplate and the second endplate, the filter media defining a central opening extending axially therein; and
a support structure disposed within the central opening of the filter media and attached to the first endplate and the second endplate, the support structure comprising an axial lobed extension that extends from a first end of the support structure to a second end of the support structure, the axial lobed extension comprising a unitary extension member comprising an undulating and alternating series of first lobes and second lobes, the first lobes laterally offset from the second lobes, the support structure configured to resist collapse of the filter element, wherein the support structure further comprises a plurality of cross-ribs attached to the axial lobed extension, each cross rib in the plurality of cross-ribs extending radially around a perimeter of the support structure and each cross rib axially displaced from an adjacent cross rib.

12. The filter element of claim 11, wherein each cross rib in the plurality of cross-ribs comprises a first rib band and a second rib band axially displaced from the first rib band, the first rib band concentric with the second rib band and a plurality of axial ribs are axially disposed between and connected to the first rib band and the second rib band.

13. The filter element of claim 1, wherein the first endplate comprises a first end surface and a second end surface spaced axially from the first end surface, the first endplate opening extending from the first end surface to the second end surface.

14. The filter element of claim 13, further comprising an elliptical protruding member protruding axially from the first end surface of the first endplate away from the filter media and surrounding the first endplate opening, the elliptical protruding member comprising an outer surface with a seal member.

15. The filter element of claim 14, wherein the elliptical protruding member is overmolded to the first endplate.

16. The filter element of claim 14, wherein the elliptical protruding member has an aspect ratio of between 0.035 and 0.040 inclusive.

17. The filter element of claim 14, wherein the seal member includes oppositely disposed first and second peaks such that the seal member possesses the shape of a hyperbolic paraboloid.

18. The filter element of claim 14, wherein the first end surface of the first endplate possesses a racetrack shape.

19. The filter element of claim 13, further comprising an oval protruding member protruding axially from the first end surface of the first endplate away from the filter media and surrounding the first endplate opening, the oval protruding member comprising an outer surface with a seal member.

20. The filter element of claim 19, wherein the oval protruding member possesses a shape comprising two hemispherical portions and two substantially parallel straight surfaces that connect the hemispherical portions.

* * * * *